United States Patent [19]
Chida et al.

[11] Patent Number: 5,739,914
[45] Date of Patent: Apr. 14, 1998

[54] COLORIMETRIC INSTRUMENT

[75] Inventors: Naoki Chida; Kenji Murakami, both of Tokyo, Japan

[73] Assignee: Yokogawa Instrument Corporation, Tokyo, Japan

[21] Appl. No.: 748,245

[22] Filed: Nov. 12, 1996

[51] Int. Cl.$^6$ .................................................. G01J 3/51
[52] U.S. Cl. .................. 356/405; 356/419; 356/416
[58] Field of Search .......................... 356/405, 406, 356/407, 416, 417, 402

[56] References Cited

U.S. PATENT DOCUMENTS

| | | | |
|---|---|---|---|
| 3,737,239 | 6/1973 | Adams et al. | 346/416 |
| 4,131,540 | 12/1978 | Husome et al. | 250/226 |
| 4,278,538 | 7/1981 | Lawrence et al. | 356/405 |
| 4,505,589 | 3/1985 | Ott et al. | 356/406 |
| 4,785,366 | 11/1988 | McComb et al. | 356/405 |
| 4,823,185 | 4/1989 | Miyamoto et al. | 356/405 |
| 4,834,541 | 5/1989 | Yamaba | 356/406 |
| 4,989,982 | 2/1991 | Osaki et al. | 356/405 |
| 5,168,155 | 12/1992 | Arima et al. | 356/405 |

FOREIGN PATENT DOCUMENTS

| | | | |
|---|---|---|---|
| 230366 | 12/1984 | Japan | 356/402 |
| 2816940 | 10/1979 | Netherlands | 356/419 |

*Primary Examiner*—F. L. Evans
*Assistant Examiner*—Zandra V. Smith
*Attorney, Agent, or Firm*—Moonray Kojima

[57] ABSTRACT

A stimulus values direct reading colorimetric instrument comprising a plurality of photoelectric sensors having different spectral responsivities equal or approximately equal to color matching functions $\bar{X}(\lambda)$, $\bar{Y}(\lambda)$, and $\bar{Z}(\lambda)$; and measuring and display device to measure and display the tri-stimulus values X,Y and Z and the chromaticity of the light to be measured by computing the photoelectric sensor output signals caused by the light, wherein the instrument calculates the stimulus values corresponding to the tri-stimulus values and measures the chomaticity by providing at least one corrective photoelectric sensors so as to maximize their spectral responsivities in the vicinity of the transmission threshold wavelengths of each sensor and taking the sum of the output signals from the sensors and the corrective sensor after multiplying each coefficient assigned to the signals by each output signal, respectively.

10 Claims, 5 Drawing Sheets

COLORIMETRIC INSTRUMENT

BACKGROUND OF THE INVENTION

1. Field of Invention

This invention relates to colorimetric instruments; and more particularly, to improvements therein of measurement accuracy, uniformity of measured values within the field of view, and/or improvements in measured light quantity.

2. Description of the Related Art

In the conventional stimulus values direct reading colorimetric instrument [for example as provided in JIS (Japanese Industrial Standard) Z8724] three photoelectric sensors x2, y and z, or four photoelectric sensors x1, x2, y and z having spectral responsivities approximately equal to the color matching functions, are provided and the chromaticity coordinates are calculated by obtaining the tri-stimulus values X,Y and Z of each sensor output.

In such an instrument, the spectral responsivity of each sensor greatly affects the measurement accuracy of chromaticity measurement. Permissible limiting values of the spectral responsivities are shown in below Table 1 of the above mentioned JIS Z8724, and many conventional colorimetric instruments are produced in accordance with the permissible limiting values specified in such JIS. The foregoing values are considered to be realistic values which can be achieved using currently available optical filters and detecting element.

Accuracy of chromaticities in conventional standard stimulus values direct reading colorimetric instruments is, for example, about ±0.03 for x and y, respectively. However, the number of colors to be measured has increased lately because of technical progress, such as the use of many colors is a display, color control of illumination light, etc. Thus, more accurate measurement of chromaticity coordinates is now desired. For example, the chromaticity reproducibility of backlighting of liquid crystal displays is about ±0.01. Thus, colorimeters that measure chomaticity must have a chromaticity accuracy of at least the same order of magnitude. To meet this requirement, however, measurement accuracy in conventional colorimetric instruments is often insufficient.

SUMMARY OF THE INVENTION

Accordingly, an object of the invention is to overcome the aforementioned and other disadvantages and deficiencies of the prior art.

The foregoing and Other objects are attained by the invention which encompasses a colorimetric instrument which prevents decrease in chromaticity measurement accuracy due to deviations of the spectral responsivity of each photoelectric sensor from color matching functions by providing at least one corrective photoelectric sensor whose spectral responsivity is maximized in the vicinity of the transmission threshold wavelengths of each color matching function of the photoelectric sensors, wherein the spectral responsivities approximate the color matching functions.

The invention colorimetric instrument comprises at least one photo electric sensor having different spectral responsivities equal or approximately equal to the color matching functions $\bar{x}(\lambda)$, $\bar{y}(\lambda)$, and $\bar{z}(\lambda)$; and means for measuring and displaying the tri-stimulus values X,Y and Z, and the chromaticity, or the like, of the light to be measured by computing the photoelectric output signal produced in response to the light, so that the instrument can calculate the stimulus values corresponding to the tri-stimulus values and measure the chromaticity, or the like, by providing at least one corrective photoelectric sensor in such a manner as to maximize the spectral responsivity thereof in the vicinity of the threshold wavelength of each photoelectric sensor, and then, taking the sum of the output signals of the photoelectric sensors and the corrective sensors, after multiplying each coefficient by each output signal, respectively.

DETAILED DESCRIPTION OF THE PREFERRED EMBODIMENTS.

Figure 1:
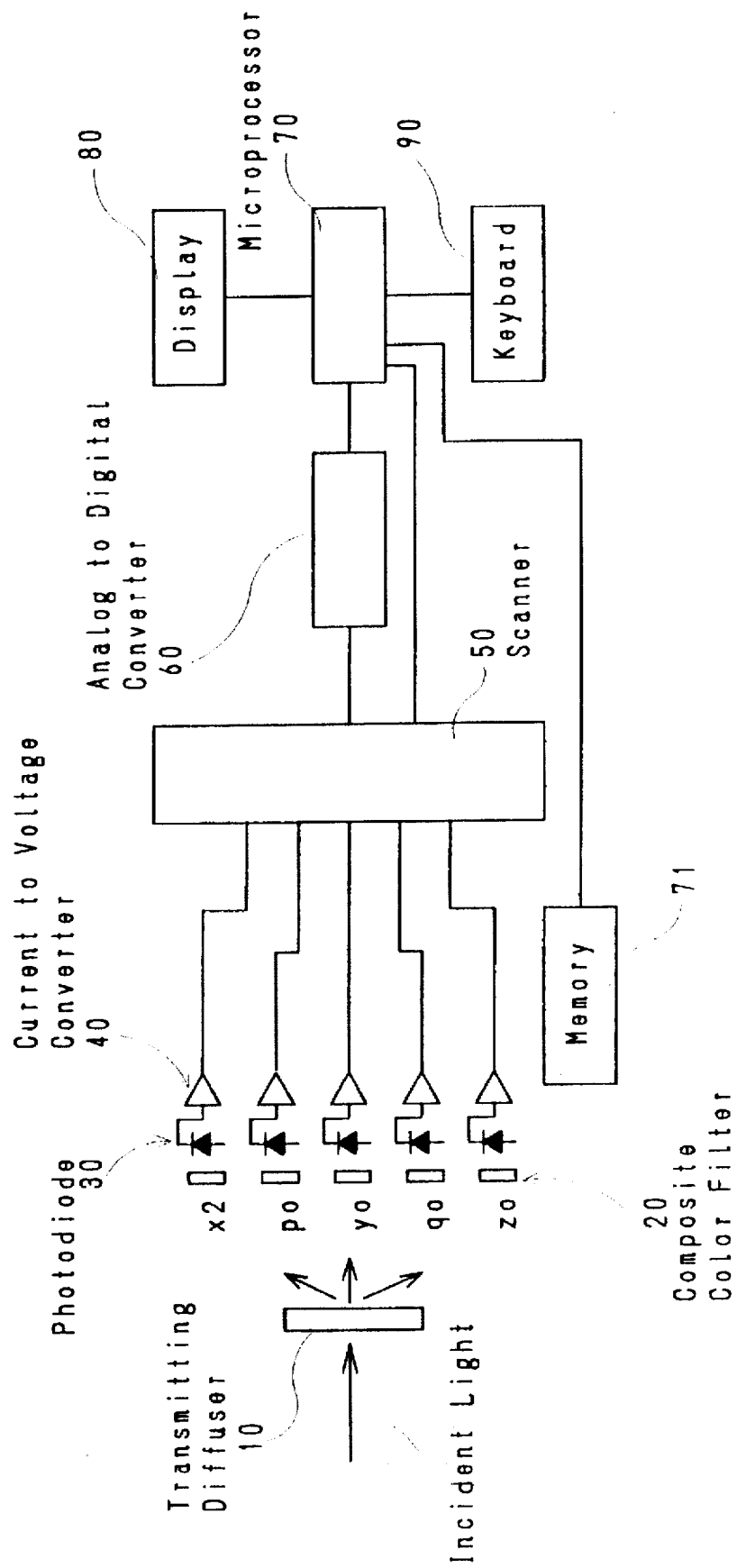
FIG. 1 is a block diagram depicting an illustrative embodiment of the invention.

FIG. 1 shows a colorimetric instrument comprising a transmitting diffuser 10, to diffuse incident light, composite color filter 20, photodiodes 30, current to voltage converters 40, and scanner 50. There are five filters 20 and five photodiodes 30 shown in FIG. 6 as an example. Each filter 20 and corresponding photodiode element 30 combined together form a photosensor. Each photoelectric sensor is connected to scanner 50 via converter 40, respectively.

An A/D convert 60, microprocessor 70, non-volatile read only memory (otherwise called a "ROM") 71, display 80 and keyboard 90 are connected as follows: The output of scanner 50 is connected to microprocessor 70 via A/D converter 60, and microprocessor 70 is connected to display 80, keyboard 90 and ROM 71. In ROM 71, calibration values or addition coefficients, specific to individual photoelectric sensors, are stored. Scanner 50 is controlled as to its "ON" and "OFF" functions by microprocessor 70.

Composite color filters 20 use colored glass filters, acetate filters, or a combination of multi-layered films of dielectric, and the results of their composite spectral transmittance and the spectral. sensitivities of photodiodes 30 are approximated to the desired spectral responsivities, respectively. Each photoelectric sensor, comprising filters x20, y0, and z0 and the photodiodes corresponding to these filters, is the same as that in the conventional instrument. However, the photosensors, comprising filters p0 and q0 and the photodiodes corresponding thereto, are those added by the invention.

Figure 2:
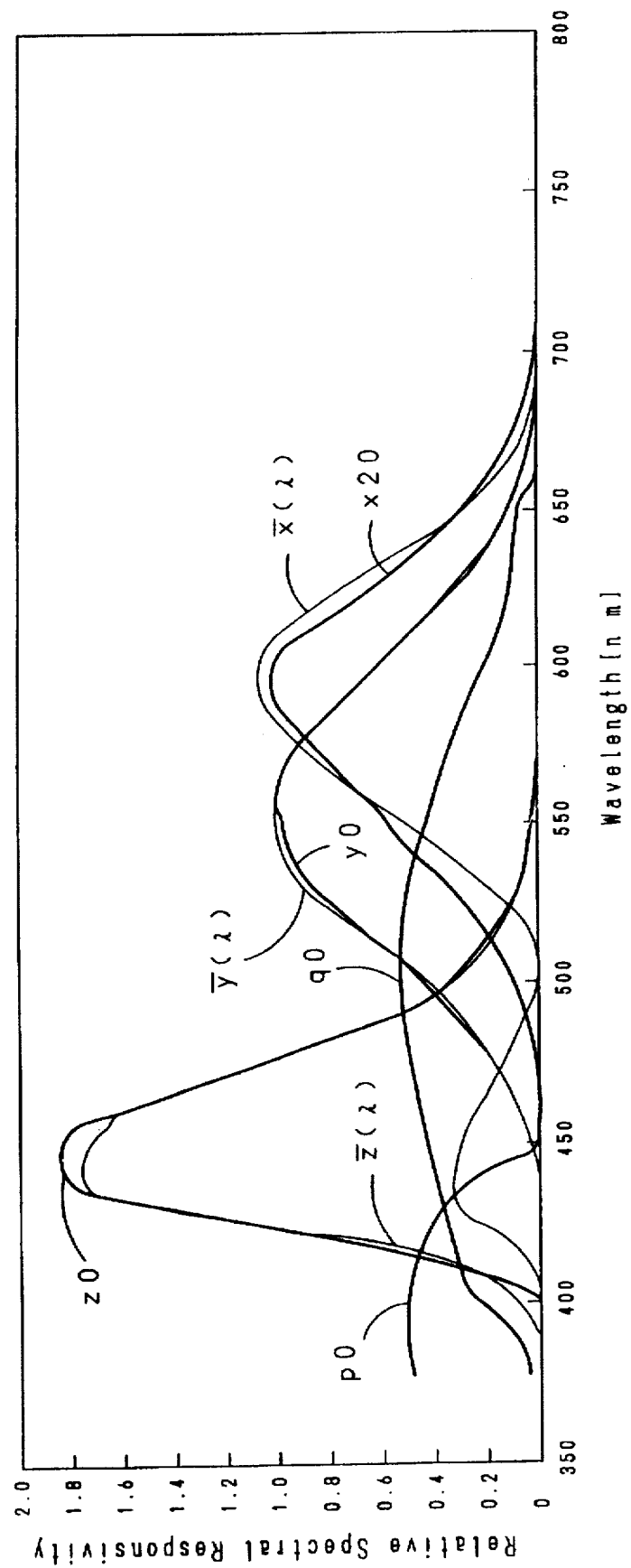
FIG. 2 is a graph depicting color matching functions and spectral responsivities.

FIG. 2 shows the color matching functions $\bar{x}(\lambda)$, $\bar{y}(\lambda)$ and $\bar{z}(\lambda)$ and the spectral responsivities x20, y0, z0, p0 and q0 of the photoelectric sensors comprising filters 20 and diodes 30 shown in FIG. 1. The wavelength (in nm) is used as the abscissa and the relative responsivity is used as the ordinate.

The photoelectric sensors, comprising corrective filters p0 and q0 provided in the invention, are selected so that the spectral responsivities thereof, are maximized in the vicinity of the transmission threshold wavelengths for each spectral responsivity of the photoelectric sensors, including the filters x20, y0, and z0. In other words, photoelectric sensor p0 is provide on the shorter wavelength region side of the photoelectric sensor z0, and the photoelectric sensor q0 is provided between z0 and y0.

The output signal from each photoelectric sensor, comprising filter 20, and including the corrective filters p0 and q0 and diode 30 is converted to digital signals by A/D converter 60, respectively. The measured values are indicated in display 80 under the control of microprocessor 70. If the measured values of each spectral responsivity, measured by microprocessor 70, are assumed to be X20, Y0, Z0, P0, and Q0, the tri-stimulus values for the colorimetric instrument shown in FIG. 1, the values of X', Y', and Z' are given by the following:

$$X'=\alpha_{11}X_{20}+\alpha_{12}Y_0+\alpha_{13}Z_0+\alpha_{14}P_0+\alpha_{15}Q_0$$
$$Y'=\alpha_{21}X_{20}+\alpha_{22}Y_0+\alpha_{23}Z_0+\alpha_{24}P_0+\alpha_{25}Q_0$$
$$Z'=\alpha_{31}X_{20}+\alpha_{32}Y_0+\alpha_{33}Z_0+\alpha_{34}P_0+\alpha_{35}Q_0$$

The microprocessor 70 calculates and displays the chromaticity coordinates or color temperature, or the like, using the above equations.

The coefficients $\alpha_{11}, \alpha_{12} \ldots \alpha_{35}$, are determined when manufacturing each photoelectric sensor. There are two methods for determining the coefficients.

First, if the source of the type of light to be measured is not known, measurement are made using coefficients obtained so that the deviation of the color matching functions X', Y' and z' obtained by calculation from the ideal color matching functions $\bar{x}(\lambda)$, $\bar{y}(\lambda)$ and $\bar{z}(\lambda)$, is minimized.

Second, on the other hand, if the source of light to be measured can be specified, such as a "liquid crystal panel" using three wavelength fluroscent lamp as the backlighting or a "tail lamp obtained by covering a lamp with a colored glass filter", the chromaticity measuring accuracy can be higher by using coefficients obtained so that the deviation between the following two multiplied values are minimized, the first multiplied value being of the computed color matching functions X', Y' and Z' multiplied by each wavelength in the spectral radiance of the standard light source or typical light source, and the second multiplied value being the ideal color matching functions $\bar{x}(\lambda)$, $\bar{y}(\lambda)$, and $\bar{z}(\lambda)$ multiplied by each wavelength in the spectral radiance of the standard or typical light source.

In the invention, it is sufficient for determining each coefficient to select only a code expressing the light source indicated in display 80. A user is not required to be aware of the proper numerical values.

Determination of the coefficients is described below. As shown above, x20, y0, z0, p0, and q0 are spectral responsivities of each photoelectric sensor comprising filter 20 and diode 30. Since these spectral responsivities are functions of wavelength l, they can be expressed as $x20(\lambda)$, $y0(\lambda)$, $z0(\lambda)$, $p0(\lambda)$, and $q0(\lambda)$, respectively. In addition, let the color matching functions obtain by computation of the output signals from each photosensor be $x'(\lambda)$, $y'(\lambda)$, and $z'(\lambda)$; then, these can be expressed as follows:

$$x'=\alpha_{11}x_{20}(\lambda)+\alpha_{12}y_0(\lambda)+\alpha_{13}z_0(\lambda)+\alpha_{14}p_0(\lambda)+\alpha_{15}q_0(\lambda)$$
$$y'=\alpha_{21}x_{20}(\lambda)+\alpha_{22}y_0(\lambda)+\alpha_{23}z_0(\lambda)+\alpha_{24}p_0(\lambda)+\alpha_{25}q_0(\lambda)$$
$$z'=\alpha_{31}x_{20}(\lambda)+\alpha_{32}y_0(\lambda)+\alpha_{33}z_0(\lambda)+\alpha_{34}p_0(\lambda)+\alpha_{35}q_0(\lambda)$$

In this case, the following functions are considered as presenting errors for the above color matching functions x', y' and z' after computations from ideal color matching functions $\bar{x}(\lambda)$, $\bar{y}(\lambda)$ and $\bar{z}(\lambda)$:

$$t_x(\lambda)=|x'(\lambda)-\bar{x}(\lambda)|$$
$$t_y(\lambda)=|y'(\lambda)-\bar{y}(\lambda)|$$
$$t_z(\lambda)=|z'(\lambda)-\bar{z}(\lambda)|$$

Since coefficients $\alpha_{11}, \alpha_{12}, \ldots \alpha_{35}$ in the color matching functions after computations x', y', and z' also include information on the absolute values of the color matching functions, these functions correspond to the spectral sensitivity equations in JIS Z8724. Thus, the error is minimized by determining the values of coefficient $\alpha_{11}, \alpha_{12}, \ldots, \alpha_{35}$ so that $t_x(\lambda)$, $t_y(\lambda)$, and $t_z(\lambda)$ become minimum in the range of the wavelengths of 380 to 780 nm. Therefore, if the maximum values of $t_x(\lambda)$, $t_y(\lambda)$, and $t_z(\lambda)$ in the above range are assumed to be $T_x, T_y$, and $T_z$, the values of coefficients $\alpha_{11}, \alpha_{12}, \ldots \alpha_{35}$ can be determined by the following equations:

$$(\partial Tx2/\partial\alpha_{11})=0 \quad (\partial tX/\partial\alpha_{12})=0$$
$$(\partial Tx/\partial\alpha_{13})=0 \quad (\partial Tx/\partial\alpha_{14})=0$$
$$(\partial Tx/\partial\alpha_{15})=0$$
$$(\partial Ty/\partial\alpha_{21})=0 \quad (\partial Ty/\partial\alpha_{22})=0$$
$$(\partial Ty/\partial\alpha_{23})=0 \quad (\partial Ty/\partial\alpha_{24})=0$$
$$(\partial Ty/\partial\alpha_{25})=0$$
$$(\partial Tz/\partial\alpha_{31})=0 \quad (\partial Tz/\partial\alpha_{32})=0$$
$$(\partial tz/\partial\alpha_{23})=0 \quad (\partial Tz/\partial\alpha_{34})=0$$
$$(\partial Tz/\partial\alpha_{35})=0$$

The foregoing equations can be solved through numerical calculations using Newton's method or the like.

Using the above coefficients $\alpha_{11}, \alpha_{12}, \ldots \alpha_{35}$ determined by the above method, the chromaticity error becomes minimal if a white light source, whose spectral luminance distribution is completely flat, is assumed- However, for a light source that is actually measured, the coefficients are not necessarily values which provide minimal error. Accordingly, it is effective to use a method wherein several spectral luminances, represented by light sources to be measured, are assumed and the coefficients for those spectral luminances are determined in advance, and the coefficients are switched depending on the light source to be measured. For determining the coefficients, it is sufficient to replace the above error functions with the following:

$$t_x(\lambda)=|x'(\lambda)-\bar{x}(\lambda)|f(\lambda)$$
$$t_y(\lambda)=|y'(\lambda)-\bar{y}(\lambda)|f(\lambda)$$
$$t_z(\lambda)=|z'(\lambda)-\bar{z}(\lambda)|f(\lambda)$$

where $f(\lambda)$ shows the spectral luminance distribution for an assumed light source.

Figure 3:
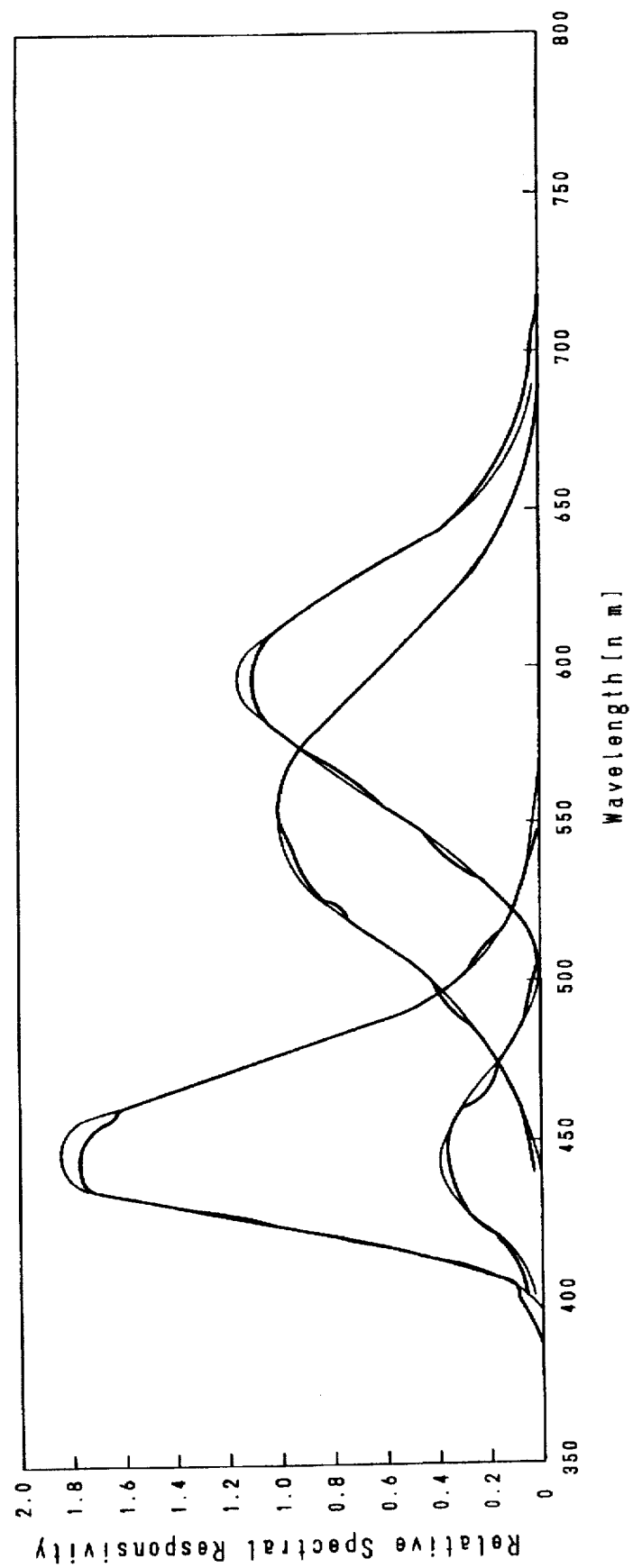
FIG. 3 is a graph depicting the color matching functions obtained by the invention.

FIG. 3 shows the color matching functions obtained by the colorimetric instrument of the invention, after correction, wherein the thick lines represent the color matching functions obtained by the invention, and the thin lines represent the ideal color matching functions. As shown in FIG. 3, the invention produces very small errors.

A comparison of the permissible limiting values provided by the invention with those provided in JIS Z8724 is shown in Table 1 below. As apparent from the table, the invention provides a colorimetric instrument having approximately one half of the values of the errors as the permissible limiting values specified in JIS Z8724. This is a substantial improvement over the art.

TABLE 1

| Color matching Functions | Wavelength Range | Permissible Limiting values in JIS | Invention |
|---|---|---|---|
| $x(\lambda)$ | 500 nm or less | 0.10 | 0.052 |
|  | 505 nm or more | 0.15 | 0.052 |
| $y(\lambda)$ | Entire wavelength Range | 0.10 | 0.047 |
| $z(\lambda)$ | Entire Wavelength Range | 0.40 | 0.092 |

In this embodiment, although two corrective photoelectric sensors p0 and q0, are provided, with p0 being on the shorter wavelength side of z0 and q0 being between z0 and y0 in the wavelength range, the position of the corrective photoelectric sensors is not limited to such locations. Since the purpose of providing corrective photoelectric sensors is to correct the filter characteristics and deviations from the color matching functions due to dispersions in the filter characteristic produced during production, the photoelectric sensors can be set in any wavelength region where the deviation becomes large. Generally, since errors or dispersions become large near the filter cut-off wavelengths, where the filter transmittance decreases to about ½ of the maximum transmission, it is preferred to provide corrective photoelectric sensors in such wavelength regions.

For example, assume use of a photoelectric sensor configuration of six sensors, a corrective photoelectric sensor can be added having maximum sensitivity on the longer wavelength side of the x or y sensor to the photoelectric sensors shown in the embodiment. On the other hand, if eight corrective photoelectric sensors are provided on both the longer and shorter wavelength sides of each x1, x2, y and z sensors, more accurate corrections can be achieved.

Since the invention instrument is provided with corrective photoelectric sensors whose spectral responsivities become maximum in the vicinity of the transmission threshold wavelengths of each color matching function, a simple colorimetric instrument is obtained wherein the photoelectric sensors have spectral responsivities which are approximately equal to the color matching functions, and a decrease is prevented from occuring in the chromaticity measurement accuracy, which would otherwise occur due to the deviations of the spectral responsivities of each photoelectric sensor from the color matching functions.

In the above described stimulus values direct reading colorimetric instrument, at least three or more sensors of different types are provided, whose spectral responsivities are analogous to the color matching functions, or part thereof, and the incident light is provided to each photoelectric sensor after being divided.

In ideal colorimeters of the luminance type, each output of three or more photoelectric sensors must indicate the same value for the light from any particular surface, which is assumed to be a definite area on the surface to be measured and where the luminance and chromaticity to be measured are uniform, when that minute surface is included in the effective field of view of the colorimeter. If there is non-uniformity in the output signals existing in the field of view, then a large error may result when the non-uniform luminance surface or luminance surface tilting toward the optical axis of the meter, is measured.

In order to avoid such error, more than one photoelectric sensor should be positioned in the same place. However, since positioning of the sensors in the same place is nearly impossible, means should be provided to obtain an equivalent optical position. Such a device comprises a transmitting diffuser, made for example of opal glass, opal resin, or ground glass, or the like, and used for the incident aperture to eliminate the spatial information contained in the incident light and to make the light incident to each photoelectric sensor uniform. The distance between each photoelectric sensor and the transmitting diffuser should be sufficiently large in order to improve the uniformity of spatial information. However, there may be problems arising when the distance is large. For example the photoelectric sensor output signals may decrease and the instrument geometry may have to be increased. Thus, making the spatial information uniform, that is the Uniformity in the field of view of the measurement, is difficult to achieve in a practical manner.

Figure 4:
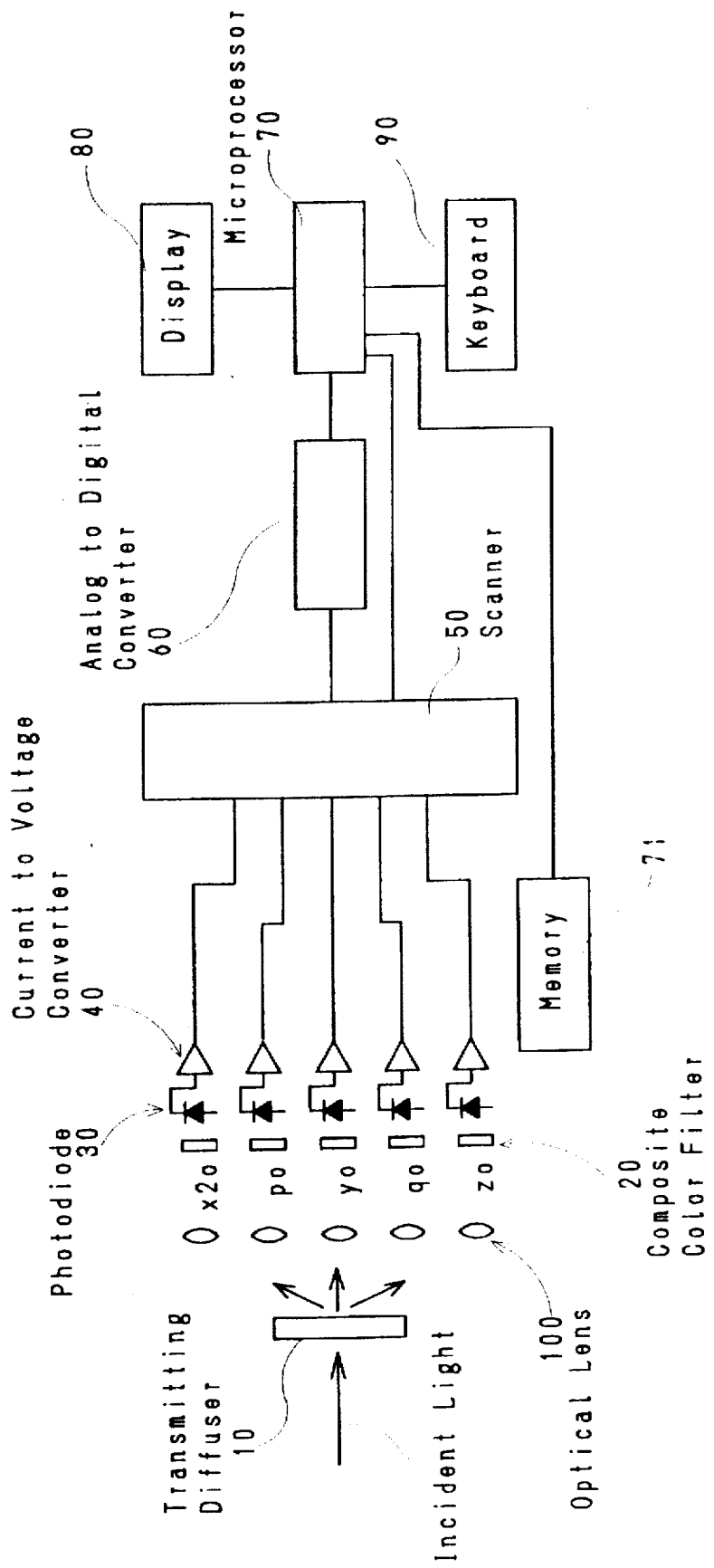
FIG. 4 is a block diagram depicting another illustrative embodiment of the invention.

FIG. 4 shows another illustrative embodiment, wherein such problems are resolved. The difference between the embodiments of FIGS. 4 and 1, is that in FIG. 4, optical lens 100 is located between transmitting diffuser 10 and composite color filter 20. In FIG. 4, the parts equivalent to those shown in FIG. 1 are provided with the same numerals, and a description thereof is omitted hereat for sake of clarity of description.

Figure 5:
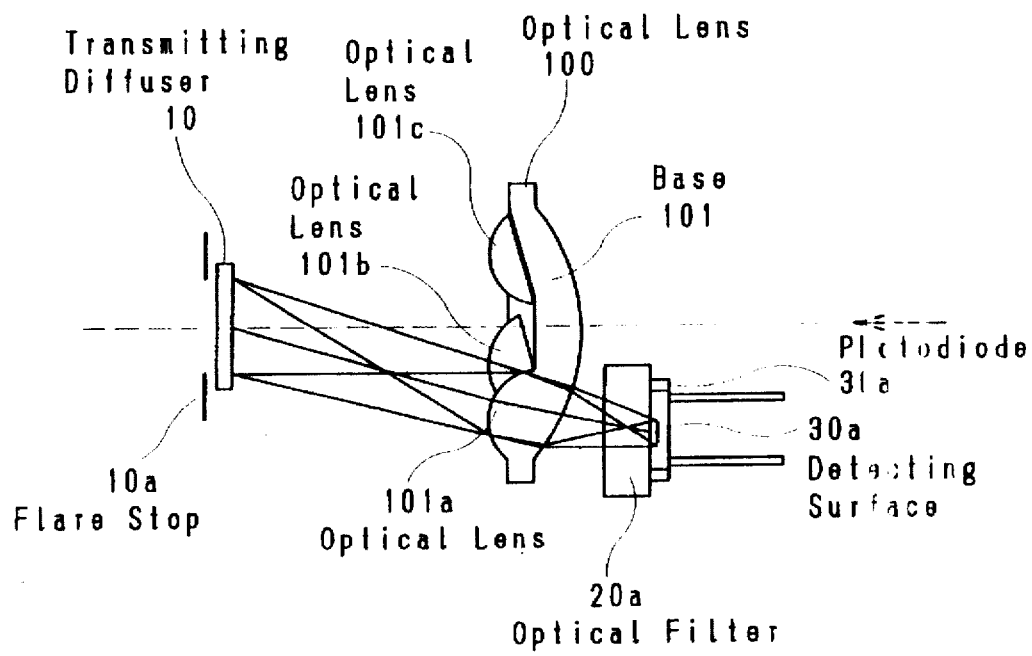
FIG. 5 is a view depicting essential parts of the optical system of the invention.
Figure 6:
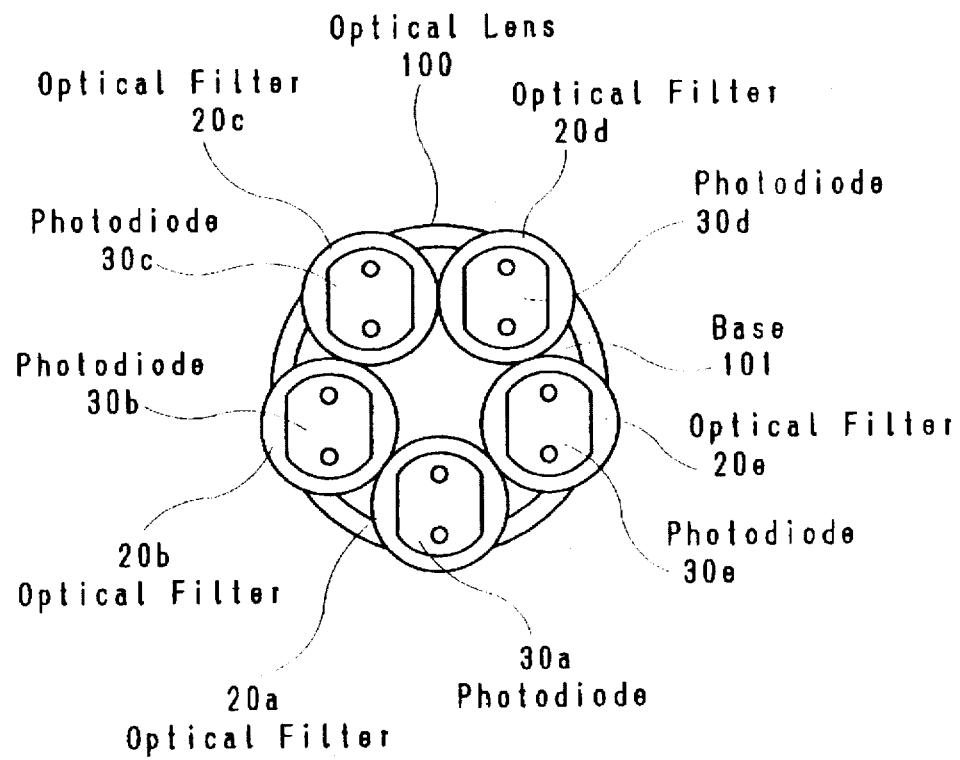
FIG. 6 is a rear view of the embodiment of FIG. 5 depicting the optical system of the invention.

An example of the optical system of the invention is shown in FIGS. 5 and 6, wherein FIG. 5 is side view and FIG. 6 is a rear view, that is in the direction of the arrow. FIGS. 5 and 6 show transmitting diffuser 10 of FIG. 1, with flare stop 10a used to determine the incident aperture located in the front of diffuser 10. Provided is a detecting surface 30a' of photodiode 30a. Filter 20a and photodiode 30a taken together form a photoelectric sensor, as in FIG. 1. As shown in FIG. 6, filters 20a,20b, . . . 20e and photodiodes 30a,30b, . . . , 30e are arranged and fixed in a rotation-symmetrical manner at the rear of optical lens 100, respectively.

Optical lens 100 may be of glass or plastic or the like. The base 101 of lens 100 has a spherical surface (see FIG. 5) with the same center. On the inner side of base 101, five lenses 101a,101b . . . . . . . , 101e are formed on base 101 by an integral molding process, and in the positions opposite optical filters 20a,20b, . . . 20e. Lenses 101a,101b, . . . ,101e are located on the side of the incident light produced by diffuser 10, and base 101 forms the emitting surface.

The incident light whose aperture is determined by the flare stop 10a, which determines the incident aperture, is diffused with diffuser 10 and is made incident to each lens 101a, 101b, . . . 101e comprising optical lens 100. In this case, as shown in FIG. 5, for example, light incident to lens 101a forms an image on detecting surface 30a' of photodiode 30a via optical filter 20a located at the rear of base 101 through lens 100. In a similar manner, the light incident to lenses 101b,101c,101d, and 101e forms images on each photodiode 30b, 30c, 30d, and 30e, through lenses 101b, 101c, . . . 101e, respectively via optical filters 20b,20c, 20d, and 20e located at the rear thereof.

Returning to FIG. 4, the incident light whose aperture is determined by the flare stop 10a is diffused with diffuser 10 and is made incident to optical lens 10, as just described. The incident light is diaphragmed by each lens 101a, 101b, . . . , 101e and forms an image on each detecting surface of photodiodes 30a,30b, . . . . . 30e via each optical filter 20a,20b, . . . 20e located at the rear of the lenses. Photo diodes 30a,30b, . . . 30e produces output currents corresponding to the detect light intensities and the currents are accessed in turn via scanner 50 after being converted to voltage signals by current to voltage converter 40, and then converted to digital signals, respectively, by A/D converter 60. Operation of the embodiment after that is similar to that described with reference to the embodiment of FIG. 1.

In this case, the light diffused by diffuser 10 generally retains the spatial information in the incident light immediately after diffuser 10, but when transmitted away from diffuser 10, the spatial information is lost and the light is nearly uniform at a distance of about 10 times the aperture diameter of flare stop 10a. If the photoelectric sensors are positioned in an optically uniform manner after diffuser 10 without using optical lens 100, it is necessary to place the sensors in a position of about 10 times the aperture diameter away from the flare stop 10a. In such a case, the incident light quantity is reduced to about 1/100 of that obtained immediately after the aperture.

In this embodiment, since the entire aperture of flare stop 10a is formed on each sensor detecting surface, optical lens 100 can be positioned at a position which is about four times the aperture diameter away from the flare stop 10a. Thus, light quantity on the sensors is decreased to only about 1/16, thereby providing approximately six times the light quantity obtained when only the diffuser is used. In colorimeters, the minimum available photometric quantity is one of the important characteristics. Hence, controlling the quantity of incident light is an important consideration.

Since the distance from diffuser 10 to the photoelectric sensors can be controlled to be about six times the diameter of the aperture of flare stop 10a, the invention can also decrease the size of the optical system by about sixty percent.

Moreover, although optical lens 100 is integrally formed with a base and five lenses, such lenses may be formed separately from each other and from the base.

The inventive colorimetric instrument can be operated like an illuminance meter which detects the light toward the measuring point from a simple light source on the detecting surface disposed perpendicular to the central beam. Also, the invention can be operated like an illuminance meter which detects the light toward the measuring point from a specific part of the sample light source on the detecting surface disposed perpendicular to the central beam.

The invention can also measure the chromaticity of a light source in which the object to be measured emits light Moreover, the invention can measure the chromaticity of the objects which do not emit light, such as coatings, printed matter, textiles, etc. by adding a suitable illuminating means, such as a reference lamp, or the like, and a converging means, such as an integrating sphere.

Since, the invention colorimetric instrument comprises an optical lens which is arranged so that the diffuser and each sensor detecting surface have an approximate relationship to form an image of other, the invention can obtain a light quantity which is six times that of using only a diffuser, and the size of the optical system of the invention is reduced by sixty percent or more vis-a-vis the prior art. In addition, since each optical lens can be placed in a rotation symmetrical manner, there is no need to adjust each lens' position, and the lens and base can be integrally molded. Hence, the optical system of the invention is considerably lower in cost to manufacture. Moreover, although the lens spherical surface has freedom to move in six different axes, through reduction in the number of spherical surfaces, such as by using the same centers, optical lens machining is simplified, and the number of, for example (5-1)×6=24, parameters for a five element lens, can be reduced.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. In a stimulus values direct reading colorimetric instrument comprising:

a plurality of photoelectric sensors having different spectral responsivities equal to approximately equal to color matching functions and producing output signals in response to light to be measured and supplied thereto; and means for measuring and displaying tri-stimulus values and chromomaticity of said light to be measured by computing said output signals; the improvement comprising:

at least one corrective photoelectric sensor for producing output signals in response to said light to be measured and supplied thereto by taking maximum values of spectral responsivities in a vicinity of a transmission threshold wavelength of photoelectric sensors having spectral responsivities approximately equal to the color matching functions; and calculating means for calculating sum of said output signals from said plurality of photoelectric sensors and said at least one corrective photoelectric sensor, whereby said output signal from said at least one corrective photoelectric sensor is used to correct the output signals from said other plurality of photoelectric sensors.

2. The instrument of claim 1, wherein said calculating means calculates said sum after multiplying each output signal by a coefficient, said coefficient being determined so that deviations of the color matching functions obtained after computation from ideal color matching functions are minimized.

3. The instrument of claim 1, wherein said calculating means calculates said sum after multiplying computed color matching functions by each wavelength of a spectral radiance of a standard light source or typical light source, and multiplying ideal color matching functions by each wavelength of a spectra% radiance of said standard light source, and wherein the multiplied values are minimized.

4. A stimulus values direct reading colorimetric instrument comprising:

at least three photoelectric sensors producing a plurality of output signals in response to light supplied thereto and to be measured, and having different spectral responsivities approximately equal to color matching functions or a part thereof;

measuring and display means for measuring and displaying tri-stimulus values and chromaticity of said light to be measured, by computing said output signals;

transmitting diffuser means disposed in an incident aperture; and a plurality of optical lenses corresponding to said at least three photoelectric sensors, each of said plurality of optical lenses being disposed between said transmitting diffuser means and each of said at least three photoelectric sensors so that a detecting surface of each of said at least three photoelectric sensors has an optimal relationship to a source of light so as to control quantity of incident light supplied to said at least three photoelectric sensors.

5. The instrument of claim 4, further comprising calculating means for calculating a sum after multiplying each output signal by a coefficient, said coefficient being determined so that deviations of color matching functions obtained after computation from ideal color matching functions are minimized.

6. The instrument of claim 4, further comprising calculating means for calculating a sum after multiplying computed color matching functions by each wavelength of a spectral radiance of a standard or typical light source, and multiplying ideal color matching functions by each wavelength of a spectral radiance of said standard or typical light source, and wherein the multiplied values are minimized.

7. A stimulus values direct reading colorimetric instrument comprising:

at least three photoelectric sensors producing a plurality of output signals in response to light supplied thereto and to be measured, and having different spectral responsivities approximately equal to color matching functions or a part thereof;

measuring and display means for measuring and displaying tri-stimulus values and chromaticity of said light to be measured, by computing said output signals;

transmitting diffuser means disposed in an incident aperture; and a plurality of optical lenses corresponding to said at least three photoelectric sensors, each of said plurality of optical lenses being disposed between said transmitting diffuser means and each of said at least three photoelectric sensors so that a detecting surface of each of said at least three photoelectric sensors has a relationship to a source of light so as to produce an approximate image thereon of said source of light; and wherein said plurality of optical lenses are molded as an integral optical lense having at least one focal point equal to the number of said photoelectric sensors.

8. The instrument of claim 7, wherein a spherical surface of an emitting surface of said plurality of optical lenses has more than one focal point and is molded as a spherical surface having a common center.

9. The instrument of claim 7, further comprising calculating means for calculating a sum after multiplying each output signal by a coefficient, said coefficient being determined so that deviations of color matching functions obtained after computation from ideal color matching functions are minimized.

10. The instrument of claim 7, further comprising calculating means for calculating a sum after multiplying computed color matching functions by each wavelength of a spectral radiance of a standard or typical light source, and multiplying ideal color matching functions by each wavelength of a spectral radiance of said standard wherein the multiplied values are minimized.

* * * * *